US009456382B2

(12) United States Patent
Mang et al.

(10) Patent No.: US 9,456,382 B2
(45) Date of Patent: *Sep. 27, 2016

(54) PREEMPTIVE BASED RADIO CHANNEL ACCESS CONTROL

(71) Applicant: AT&T Intellectual Property I, L.P., Atlanta, GA (US)

(72) Inventors: Xiaowen Mang, Morganville, NJ (US); Carolyn Roche Johnson, Holmdel, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,741

(22) Filed: Jan. 4, 2016

(65) Prior Publication Data

US 2016/0119818 A1 Apr. 28, 2016

Related U.S. Application Data

(63) Continuation of application No. 14/569,468, filed on Dec. 12, 2014, now Pat. No. 9,258,827, which is a continuation of application No. 14/147,038, filed on Jan. 3, 2014, now Pat. No. 8,913,561, which is a continuation of application No. 12/332,814, filed on Dec. 11, 2008, now Pat. No. 8,644,216.

(51) Int. Cl.
*H04W 28/08* (2009.01)
*H04L 12/54* (2013.01)
(Continued)

(52) U.S. Cl.
CPC .......... *H04W 28/08* (2013.01); *H04L 12/5695* (2013.01); *H04L 47/245* (2013.01); *H04L 47/762* (2013.01); *H04L 47/805* (2013.01); *H04M 3/20* (2013.01); *H04M 3/367* (2013.01); *H04M 3/42187* (2013.01); *H04W 72/10* (2013.01); *H04W 74/04* (2013.01); *H04W 76/06* (2013.01); *H04W 76/066* (2013.01); *H04M 2207/18* (2013.01); *H04M 2242/04* (2013.01); *H04W 28/18* (2013.01); *H04W 48/16* (2013.01)

(58) Field of Classification Search
CPC .... H04W 28/08; H04W 72/10; H04W 76/06
See application file for complete search history.

(56) References Cited

U.S. PATENT DOCUMENTS 5,457,735 A 10/1995 Erickson
8,644,216 B2 2/2014 Mang et al.
(Continued)

OTHER PUBLICATIONS

Office Action dated Dec. 21, 2011 for U.S. Appl. No. 12/332,814, 35 pages.
(Continued)

*Primary Examiner* — Mohammad Anwar
(74) *Attorney, Agent, or Firm* — Amin, Turocy & Watson, LLP

(57) ABSTRACT

Preemptive based radio access control is facilitated. Queue data is received, wherein the queue data corresponds to a set of requests for highly prioritized communications included on a prioritized queue. The queue data is used to determine whether a set of conditions for involuntarily terminating a radio communication session has been met. Session data corresponding to characteristics for each of a plurality of radio communication sessions are also received and utilized to determine which of the plurality of radio communication sessions to terminate if the set of conditions for involuntarily terminating a radio communication session have been met.

20 Claims, 10 Drawing Sheets

(51) Int. Cl.

| | | |
|---|---|---|
| *H04L 12/851* | (2013.01) | |
| *H04L 12/923* | (2013.01) | |
| *H04L 12/927* | (2013.01) | |
| *H04M 3/20* | (2006.01) | |
| *H04M 3/36* | (2006.01) | |
| *H04M 3/42* | (2006.01) | |
| *H04W 76/06* | (2009.01) | |
| *H04W 74/04* | (2009.01) | |
| *H04W 72/10* | (2009.01) | |
| *H04W 28/18* | (2009.01) | |
| *H04W 48/16* | (2009.01) | |

(56) References Cited

U.S. PATENT DOCUMENTS

| | | |
|---|---|---|
| 8,913,561 B2 | 12/2014 | Mang et al. |
| 9,258,827 B2 * | 2/2016 | Mang .................... H04W 74/04 370/328 |
| 2005/0227718 A1 | 10/2005 | Harris et al. |
| 2008/0267376 A1 | 10/2008 | Khasnabish |

OTHER PUBLICATIONS

AT&T. BellSouth Government Emergency Telecommunications Service (GETS). www.wholesale.att.com/products_and_services/access/intelligent_network_services/gets.html. Last accessed Oct. 9, 2013.

U.S. Dept. of Homeland Security. Government Emergency Telecommunications Service (GETS). www.dhs.gov/government-emergency-telecommunications-service-gets. Last accessed Oct. 9, 2013.

U.S. Dept. of Homeland Security. Wireless Priority Service (WPS). https://www.dhs.gov/wireless-priority-service-wps. Last accessed Oct. 9, 2013.

Office Action dated Jul. 13, 2012 for U.S. Appl. No. 12/332,814, 16 pages.

Office Action dated May 2, 2014 for U.S. Appl. No. 14/147,038, 20 pages.

Office Action dated Feb. 5, 2015 for U.S. Appl. No. 14/569,468, 12 pages.

Final Office Action dated Jun. 8, 2015 for U.S. Appl. No. 14/569,468, 23 pages.

* cited by examiner

PREEMPTIVE BASED RADIO CHANNEL ACCESS CONTROL

CROSS-REFERENCE TO RELATED APPLICATIONS

This application is a continuation of, and claims priority to each of, U.S. patent application Ser. No. 14/569,468, filed Dec. 12, 2014, and entitled "METHOD AND SYSTEM FOR FACILITATING PREEMPTIVE BASED RADIO CHANNEL ACCESS CONTROL" (now U.S. Pat. No. 9,258,827, issued Feb. 9, 2016), which is a continuation of U.S. patent application Ser. No. 14/147,038, filed Jan. 3, 2014, and entitled "METHOD AND SYSTEM FOR FACILITATING PREEMPTIVE BASED RADIO CHANNEL ACCESS CONTROL" (now U.S. Pat. No. 8,913,561, issued Dec. 16, 2014), which is a continuation of U.S. patent application Ser. No. 12/332,814, filed Dec. 11, 2008, and entitled "METHOD AND SYSTEM FOR FACILITATING PREEMPTIVE BASED RADIO CHANNEL ACCESS CONTROL" (now U.S. Pat. No. 8,644,216, issued Feb. 4, 2014), the entireties of which applications are hereby incorporated herein by reference.

TECHNICAL FIELD

The subject application relates generally to the telecommunications industry, e.g., towards facilitating preemptive based radio channel access control.

BACKGROUND

Advances in computer technology (e.g., microprocessor speed, memory capacity, data transfer bandwidth, software functionality, and the like) have generally contributed to increased computer application in various industries. Particular technological advances have been made with respect to wireless applications in the telecommunications industry. However, under conditions of extreme network congestion, such advances have failed to adequately provide a method or system for allocating resources for highly prioritized communications.

In existing wireless access networks, new call requests are queued if no radio channels are available at the time. The queued call request is then served whenever radio resources become available, wherein calls marked as having a higher priority are typically served first. Under normal operational conditions, the queuing delay for call requests is typically small. Moreover, given the mobile nature of wireless device users, the availability of radio resources is very dynamic. Existing prioritized schemes are thus generally adequate under normal or mild congestion conditions.

However, under certain extreme conditions where callers typically have longer call holding times and they are concentrated at a focused area, radio resources may be fully utilized. Such conditions may, for example, arise immediately following a natural disaster where an extraordinarily large amount of people located near the disaster site may be attempting to utilize their wireless devices. Because of the potential difficulty of obtaining wireless connectivity under those conditions, some callers may be prone to hold their calls for a long time in case they are no longer able to make calls.

Under such extreme conditions, wireless networks experience radio access congestion due to the limited available radio channels, which causes the call blocking rate to rise. Existing priority calling features, such as WPS (Wireless Priority Service) and GETS (Government Emergency Telecommunications Service), are only useful when there are available radio channels. Namely, if no radio channels are available, WPS/GETS callers will not be able to obtain radio access even if all the radio channels are occupied by low priority calls. The only way for such WPS/GETS callers to access radio channels is to thus wait for an existing call to end so that a radio channel is made available. Accordingly, there is a need for a method and system that facilitates allocating radio resources to accommodate prioritized radio communications under extreme network conditions.

The above-described deficiencies are merely intended to provide an overview of some of the problems of conventional systems, and are not intended to be exhaustive. Other problems with conventional systems and corresponding benefits of the various non-limiting embodiments described herein may become further apparent upon review of the following description.

DETAILED DESCRIPTION

Figure 1:
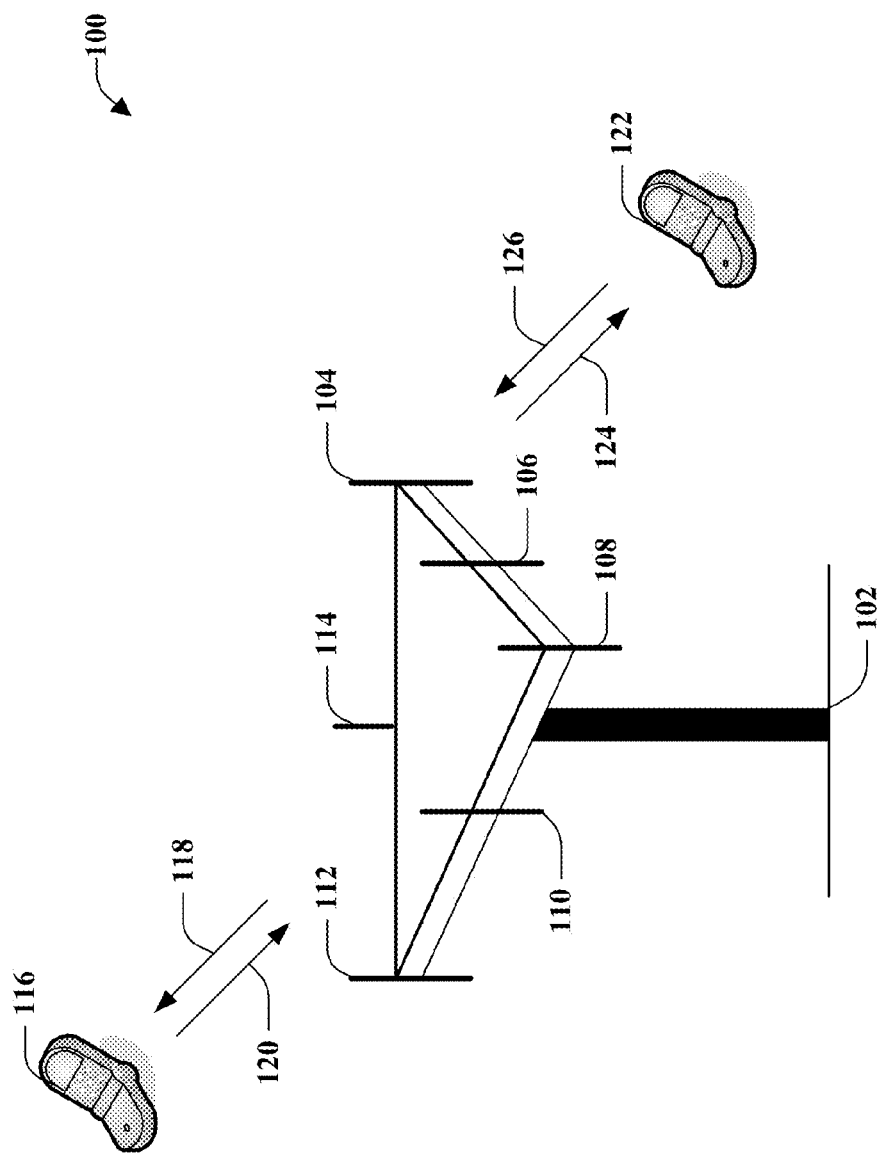
FIG. 1 illustrates an exemplary multiple access wireless communication system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident; however, that such matter can be practiced without these specific details. In other instances, well-known structures and devices are shown in block diagram form in order to facilitate describing the claimed subject matter.

As utilized herein, terms "component," "system," "data store," "engine," "template," "manager," "network," "profile," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The disclosed subject matter relates to systems and/or methods for preemptive based radio channel access control for wireless networks. In an aspect, particular in-session calls are involuntarily terminated so that higher priority calls can access the limited radio resources available under extreme events. For instance, by terminating an existing call in session that is identified as lower priority call, a WPS equivalent call can be admitted even though no radio channels may have been available when the WPS call request initially arrived. However, because of the invasive nature of involuntarily terminating an in-session call, an intelligent system and method is also provided for determining under what conditions such terminations can be invoked.

Various non-limiting embodiments of a system and method for facilitating preemptive based radio channel access control are described. In one particular embodiment, a method for initiating execution of an algorithm for involuntarily terminating a radio communication session is provided. The method includes queuing requests for highly prioritized communications onto a memory component as a prioritized queue. Within such embodiment, at least one characteristic of the prioritized queue is ascertained so as to provide at least one queue parameter. The method further includes ascertaining radio resource availability for accommodating each of the requests on the prioritized queue. Initiating execution of the algorithm for involuntarily terminating a radio communication session is then determined as a function of the radio resource availability and the at least one queue parameter, either individually or in combination.

In another non-limiting embodiment, a method for allocating radio resources to accommodate prioritized radio communications is provided. The method includes receiving a signal causing a computing device to operate in an active mode in which the signal indicates that at least one request for a highly prioritized radio communication is included on a queue and that a set of threshold conditions have been met. The method further includes executing a set of computer-readable instructions that are only executable if the computing device is operating in the active mode. Within such embodiment, the computer-readable instructions include instructions for selecting a radio communication to terminate from a plurality of radio communications in which the selected radio communication is selected as a function of characteristics corresponding to the selected radio communication. The method also includes providing a signal identifying the selected radio communication and causing the computing device to cease operating in the active mode as a function of each selected radio communication.

In yet another non-limiting embodiment, a system for facilitating preemptive based radio access control is also provided and includes a processor coupled to a memory component, a receiving component, and a transmission component. Within such embodiment, the processor is configured to execute a set of computer-readable instructions stored in the memory component, which includes a first algorithm for determining whether a set of conditions has been met for involuntarily terminating a radio communication session. The computer-readable instructions also include a second algorithm for determining which of a plurality of radio communication sessions to terminate. The receiving component is configured to receive trigger data corresponding to a set of requests for highly prioritized communications included on a prioritized queue and data corresponding to radio resource availability such that the first algorithm determines whether the set of conditions have been met as a function of the trigger data. The receiving component is also configured to receive session data corresponding to characteristics for each of the plurality of radio communication sessions such that the second algorithm determines which of the plurality of radio communication sessions to terminate as a function of the session data. And finally, the transmission component is configured to transmit termination data corresponding to an output generated by the second algorithm.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. Moreover, the system 100 can be a multiple-bearer system. A bearer can be an information path of defined capacity, delay, bit error rate, etc. Mobile devices 116 and 122 can each serve one or more radio bearers. The mobile devices 116 and 122 can employ uplink rate control mechanisms to manage and/or share uplink resources across the one or more radio bearers. In one example, the mobile devices 116 and 122 can utilize token bucket mechanisms to serve the radio bearers and to enforce uplink rate limitations.

Pursuant to an illustration, each bearer can have an associated prioritized bit rate (PBR), maximum bit rate (MBR) and guaranteed bit rate (GBR). The mobile devices 116 and 122 can serve the radio bearers based, at least in part, on the associated bit rate values. The bit rate values can also be employed to calculate queue sizes that account for PBR and MBR for each bearer. The queue sizes can be included in uplink resource requests transmitted by the mobile devices 116 and 122 to the base station 102. The base station 102 can schedule uplink resources for mobile device 116 and 122 based upon respective uplink requests and included queue sizes.

Figure 2:
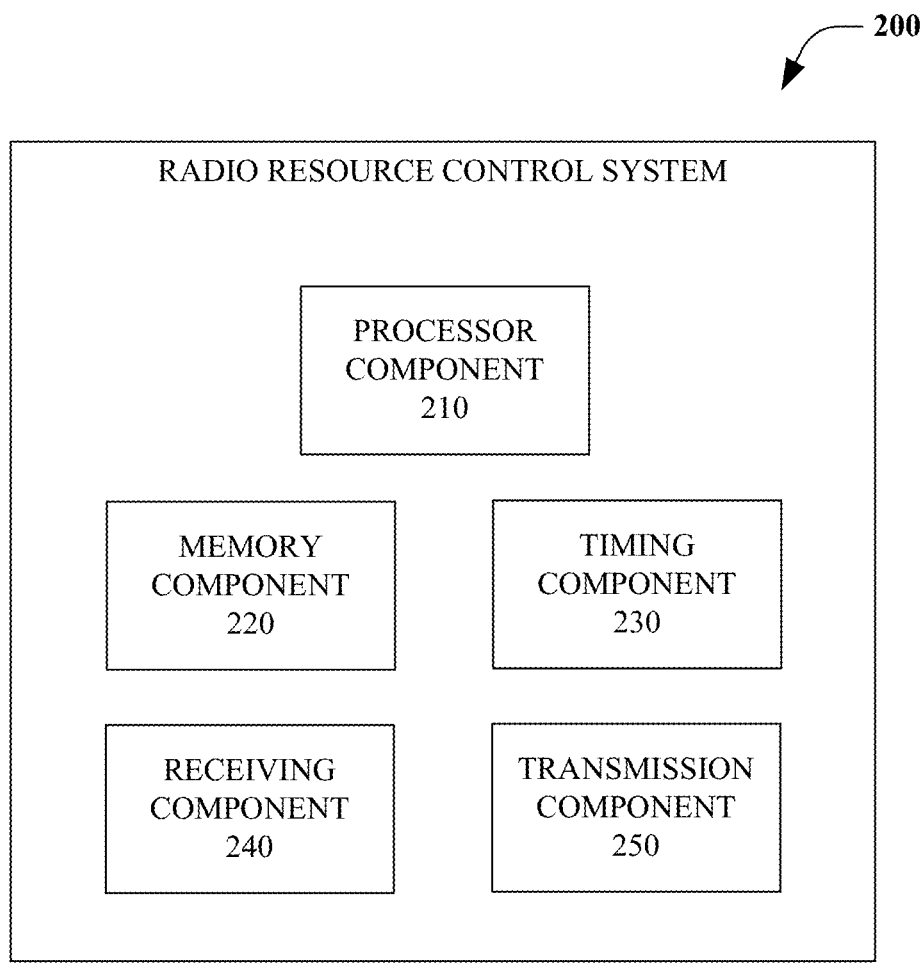
FIG. 2 illustrates a block diagram of an exemplary device that facilitates preemptive based radio access control in accordance with an aspect of the subject specification.

Referring next to FIG. 2, a block diagram of an exemplary system that facilitates preemptive based radio access control in accordance with an aspect of the subject specification is provided. As illustrated, radio resource control system 200 includes a processor component 210, a memory component 220, a timing component 230, a receiving component 240, and a transmission component 250. Here, it should be appreciated that system 200 may be implemented as either a single computing device or multiple devices comprising any combination of the aforementioned components. Similarly, it should be further appreciated that each of components 210, 220, 230, 240, and 250 may be implemented as single devices and/or multiple devices.

In an embodiment, processor component 210 is configured to execute computer-readable instructions related to any of a plurality of algorithms. In one aspect, processor component 210 is configured to execute instructions for system 200 to operate in a "detect mode" until a set of conditions has been met for entering an "active mode." Moreover, processor component 210 is configured to execute instructions for detecting when a set of conditions have been met for initiating the involuntary termination of a radio communication session. Within such embodiment, these conditions may depend on any of a plurality of factors including factors corresponding to a queue of requests for highly prioritized calls (e.g., queue depth, length of time a highly prioritized call has remained on the queue, etc.) and/or factors corresponding to the availability of radio resources in light of such requests. In other embodiments, such conditions may also include the frequency of active mode initiations such that the sensitivity of future initiations may increase/decrease according to this logged frequency.

Processor component 210 may also be configured to execute instructions for system 200 to operate in active mode. Once in active mode, the processor executes an algorithm for determining which of a plurality of radio communication sessions to terminate so as to allow a queued prioritized call to be transmitted. Within such embodiment, selecting which radio communication session should be terminated may depend on any of various factors including the priority of each radio communication (e.g., WPS, GETS, high priority, medium priority, low priority, etc.) as well as the hold time of each session (e.g., longer calls may be terminated before shorter calls). Here, it should also be appreciated that processor component 210 may be configured to terminate multiple radio communication sessions simultaneously (e.g., if an undesirably large number of prioritized calls are queued).

In an aspect, memory component 220 is coupled to processor component 210 and configured to store the computer-readable instructions executed by processor component 210. Data corresponding to parameters utilized by algorithms executed by processor component 210 may similarly be stored in memory component 220 including. Such data may, for example, include data corresponding to the prioritized queue of requests (e.g., queue depth, length of time a prioritized call has remained on the queue, etc.) and/or data corresponding to the availability of radio resources. Stored data may also include data corresponding to characteristics for each of the plurality of "candidate" radio communication sessions which may be terminated (e.g., priority data, hold time data, etc.). Here, it should be appreciated that memory component 220 can be configured in a number of different configurations, including as random access memory, battery-backed memory, hard disk, magnetic tape, etc. Various features can also be implemented upon memory component 220, such as compression and automatic back up (e.g., use of a Redundant Array of Independent Drives configuration).

In another aspect, timing component 230 is coupled to processor 210 and configured to provide data corresponding to any of a plurality of timing functions. For instance, timing component 230 may be configured to determine how long any of the requests for highly prioritized communications have remained on the prioritized queue. Timing component 230 may also be configured to determine how long any of the plurality of radio communication sessions has remained in session.

System 200 may also include receiving component 240 and transmission component 250, each of which may be coupled to processor component 210 and configured to receive/transmit various types of data. For instance, receiving component 240 may be configured to receive trigger data (i.e., data utilized to determine whether system 200 should enter active mode, including queue depth, length of time a prioritized call has remained on the queue, availability of radio resources, etc.) and/or session data (i.e., data utilized to determine which radio communication session(s) to terminate, including priority data, hold time data, etc.). Transmission component may then be configured to transmit termination data which may identify the particular radio communication session(s) selected for termination. For either of receiving component 240 or transmission component 250 it should be appreciated that operation can take place wirelessly, in a hard-wired manner, with employment of security technology (e.g., encryption), etc. It should be further appreciated that receiving component 240 can utilize various protective features, such as performing a virus scan on obtained data and blocking information that is positive for a virus.

Figure 3:
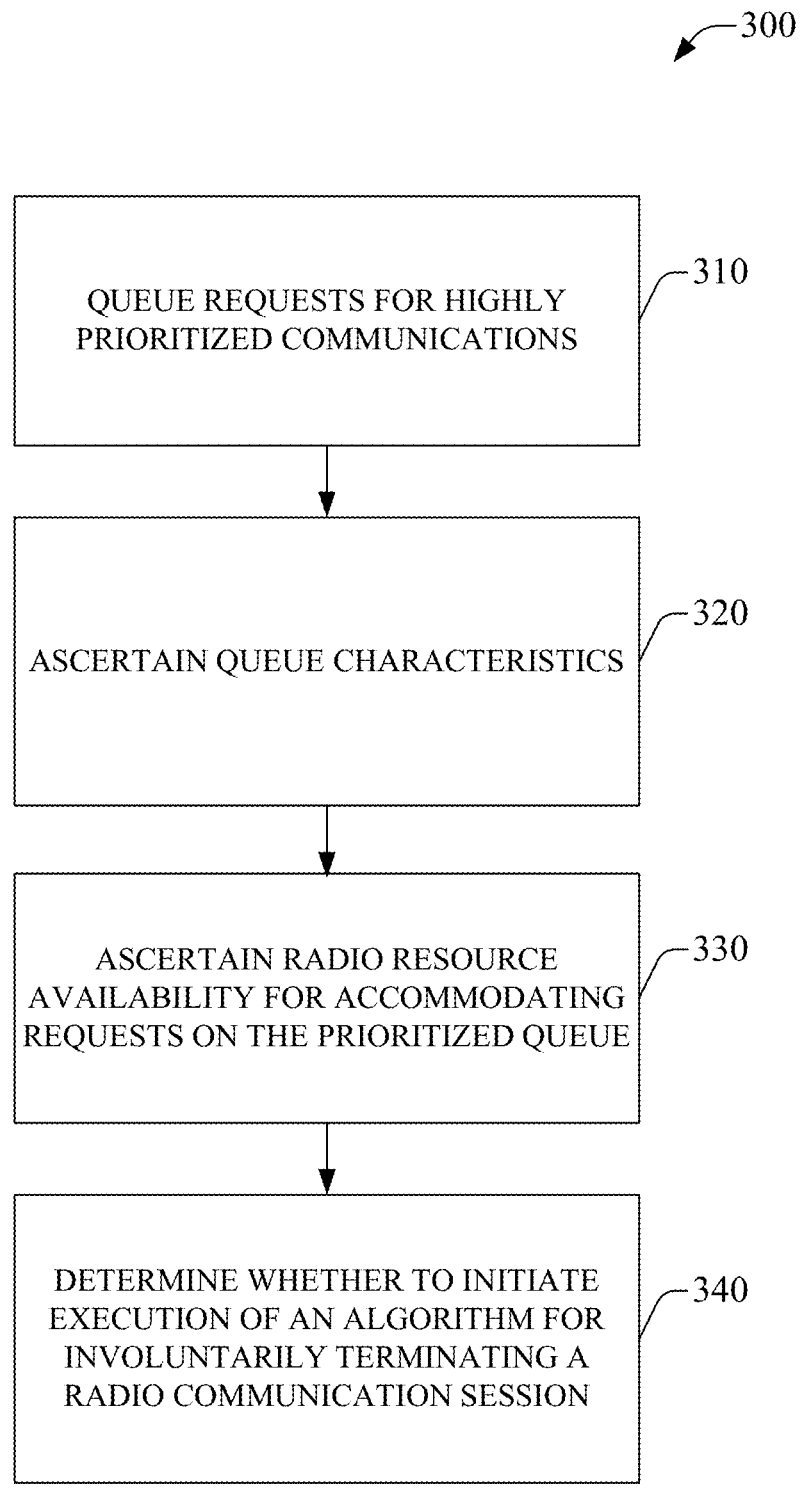
FIG. 3 illustrates a flowchart of an exemplary method for initiating execution of an algorithm for involuntarily terminating a radio communication session in accordance with an aspect of the subject specification.

Referring next to FIG. 3, a flowchart of an exemplary method for operating a radio resource control system in detect mode in accordance with an aspect of the subject specification is provided. As illustrated, process 300 begins at step 310 where requests for highly prioritized communications are queued. Such requests may be stored onto a memory component as a prioritized queue, wherein the memory component may be any combination of internal and/or external memory.

Next, at step 320, process 300 continues with particular queue characteristics being ascertained. As stated previously, such queue characteristics may include the number of highly prioritized communications on the queue and/or the length of time such communications have remained on the queue (either individually or collectively). In an embodiment, the ascertained characteristics are utilized to provide at least one queue parameter, wherein the queue parameter(s) may depend on individual queue characteristics and/or any combination of queue characteristics. Furthermore, it should be noted that each of the queue characteristics and queue parameter(s) may be expressed as a quantitative and/or qualitative value.

Process 300 then proceeds to step 330 where radio resource availability for accommodating the queued communications is ascertained. Here, radio resource availability may also be expressed as a quantitative and/or qualitative value. For instance, radio resource availability may be expressed as a quantified percentage, quantified values (# of radio bearers, each radio bearer can carry one communication channel) and/or qualitative description (e.g., high, medium, low, etc.). In other embodiments, radio resource availability may simply be expressed as a binary value (e.g., available or not available), wherein such binary value depends on whether the actual radio resource availability exceeds a particular value (e.g., whether any radio resources are available).

At step 340, process 300 concludes with a determination of whether the radio resource control system should enter active mode. In one aspect, such determination is made as a function of the queue parameter(s) and radio resource availability, either individually or in combination. In one embodiment, for example, a positive determination might be made if either of the "queue depth" or "length of time on queue" values individually exceed a particular threshold, regardless of radio resource availability (i.e., to avoid a "bottleneck" of prioritized calls on the queue). Similarly, a positive determination might be made if radio resource availability exceeds a particular threshold, regardless of the queue characteristics (i.e., so as to ensure that a percentage of radio resources are always available). Other embodiments, may include combinations in which the determination is made according to fixed threshold combinations (e.g., yielding a positive determination only if each of the "radio resource availability," "queue depth," and "length of time on queue" values exceed their respective thresholds), as well as variable "sliding scale" threshold combinations (e.g., decreasing the "radio resource availability" threshold as either of the "queue depth" and/or "length of time on queue" values increases).

Figure 4:
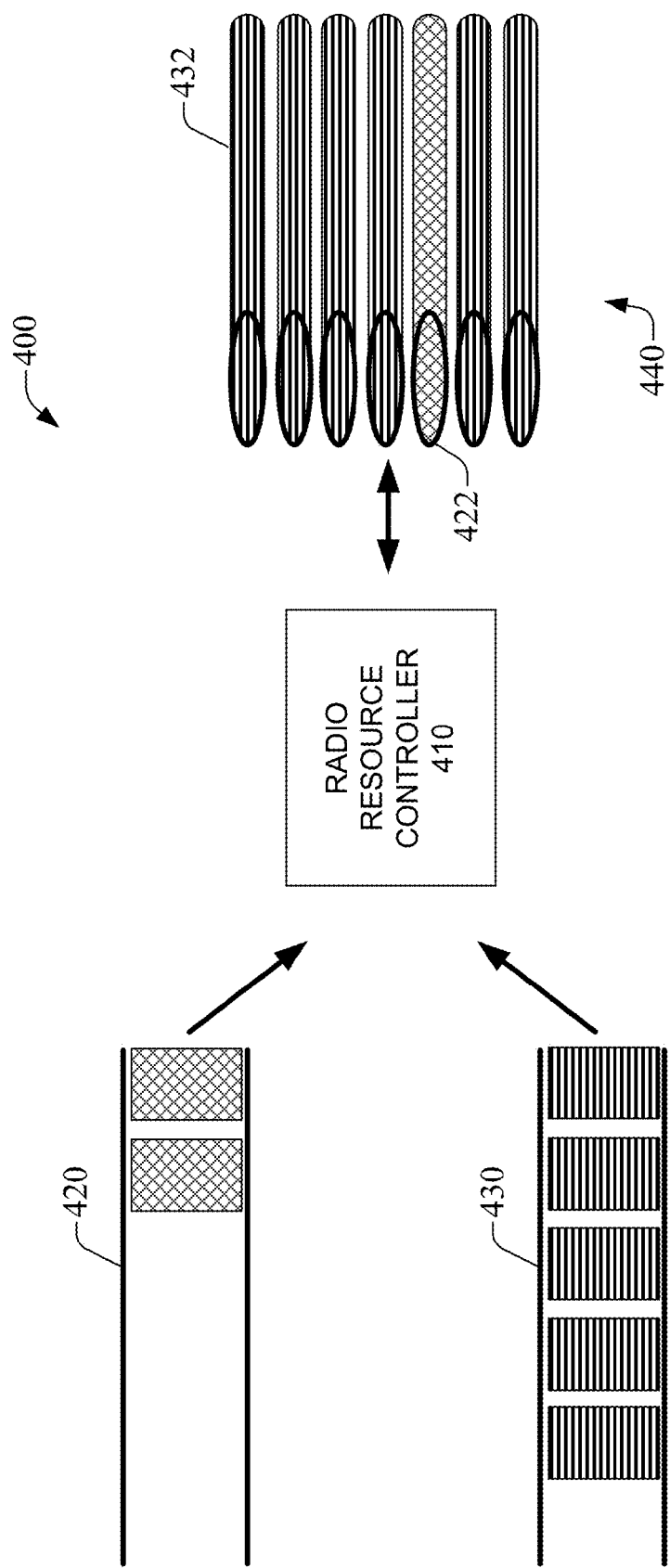
FIG. 4 is a schematic diagram illustrating an exemplary operation of a radio resource controller in detect mode in accordance with an aspect of the subject specification.

Referring next to FIG. 4, a schematic diagram illustrating an exemplary operation of a radio resource controller in detect mode in accordance with an aspect of the subject specification is provided. For this particular system 400, radio resource controller 410 operates in detect mode, wherein radio resource controller 410 monitors elements of system 400 to determine whether active mode should be initiated (i.e., whether calls should be involuntarily terminated so as to make radio channels available for highly prioritized calls). As illustrated, system 400 includes a prioritized queue 420, which is a queue of un-served high priority calls, and a low priority queue 430, which is a queue of un-served lower priority calls. Within such embodiment, the availability of radio resources depends on the number of in-session high priority calls 422 and the number of in-session low priority calls 432 that are occupying radio channels 440 (here seven channels are illustrated).

Depending on the particular threshold scheme implemented, radio resource controller 410 may continue to operate in detect mode until a set of desired threshold conditions are met. For instance, because a "queue depth" threshold may have been set to a value of three, the two un-served high priority calls shown on prioritized queue 420 might cause resource controller 410 to remain in detect mode. Alternatively, resource controller 410 might remain in detect mode because the "length of time on queue" and/or "radio resource availability" thresholds have not been exceeded.

Figure 5:
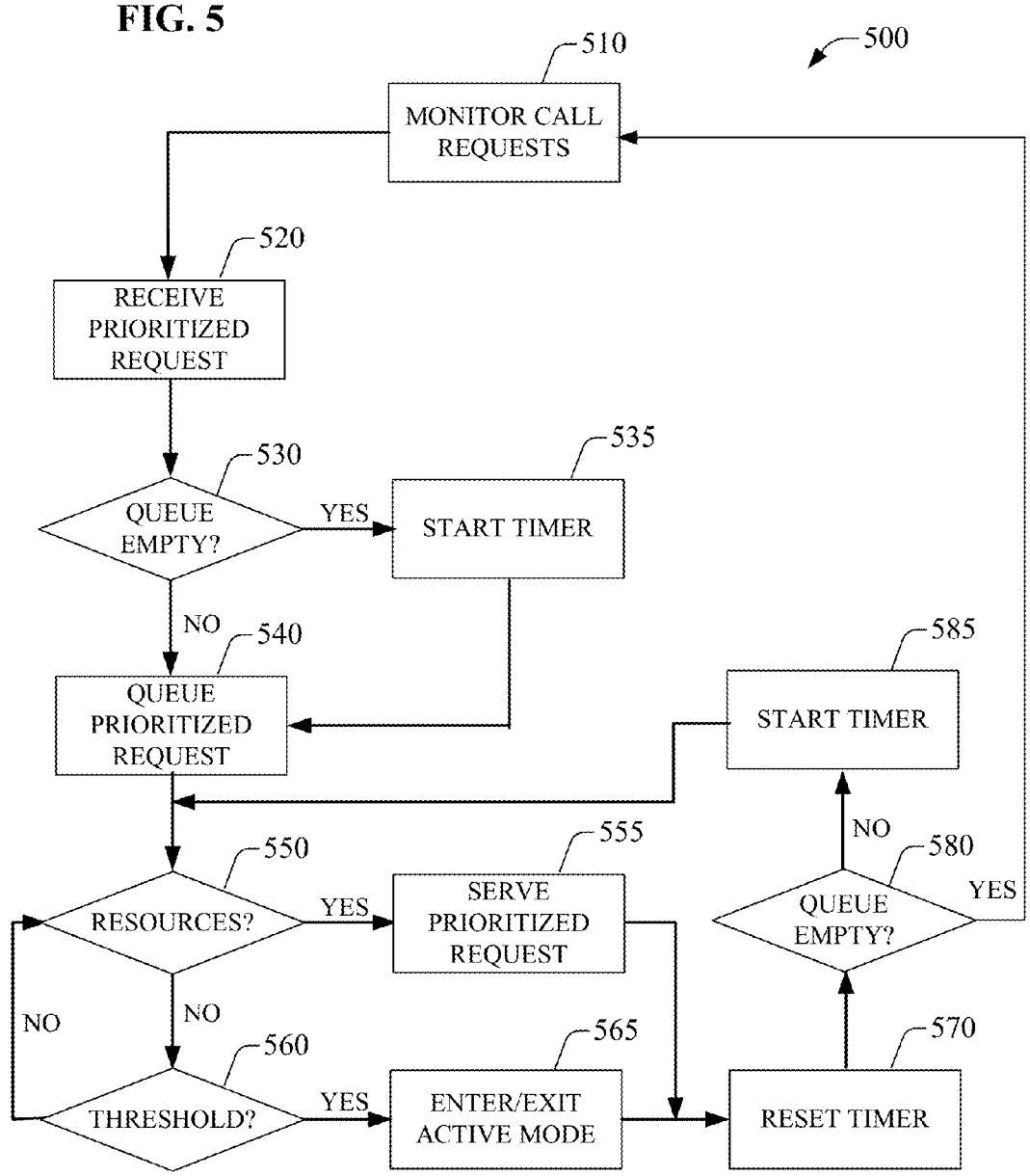
FIG. 5 illustrates an exemplary flowchart of a particular method for operating a radio resource controller in detect mode in accordance with an aspect of the subject specification.

Referring next to FIG. 5, an exemplary flowchart of a particular method for operating a radio resource controller in detect mode in accordance with an aspect of the subject specification is provided. As illustrated, process 500 begins at step 510 where the radio resource controller monitors requests for calls. Process 500 continues to monitors call requests at step 510 until a request for a highly prioritized call is received at step 520. Once a request for a prioritized call is received, process 500 determines whether the queue of prioritized calls is empty at step 530. If the priority queue is empty, a timer is started at step 535 for determining how long $t_q$ the prioritized queue has not been empty (here, it is assumed that $t_q$ is initially zero if it is determined that queue is empty) followed by step 540 where the request is queued on the priority queue. Otherwise, if the prioritized queue is not empty, process 500 proceeds directly to step 540 where the $t_q$ is assumed to have continued from the time in which a previously queued priority request initiated the timer.

Once the priority request is queued, process 500 proceeds to step 550 where it determines whether radio resources are available to accommodate any of the queued priority requests (i.e., either the newly received request or a previously queued request). If radio resources are indeed available, the first priority request on the priority queue is served at step 555. Otherwise, if resources are unavailable, process 500 proceeds to step 560.

At step 560, a determination is made as to whether a $t_q$ threshold has been exceeded. If the threshold has not been exceeded, process 500 loops back to step 550 where a resource availability determination is repeated. Otherwise, if the threshold has indeed been exceeded, the radio resource controller enters its active mode at step 565 where an in-session call is terminated to accommodate the first priority request on the priority queue.

After either a request on the priority queue is served at step 555 or the active mode is exited at step 565, $t_q$ is reset to zero at step 570. After $t_q$ is reset, another determination of whether the prioritized queue is empty is made at step 580. If the queue is now empty, process 500 loops back to step 510 where call requests continue to be monitored. Otherwise, if the queue is not empty, the queue timer is restarted at step 585 and process 500 then loops back to step 550 where the resource availability determination is repeated.

In summary, exemplary process 500 proposes a particular embodiment for invoking an active mode algorithm according to queuing time threshold. Such a process is desirable for keeping track of system dynamics because only one state parameter $t_q$ needs to be maintained by the radio resource controller, wherein all WPS call requests may be queued in a separate queue waiting for free radio channels.

Here, it should be appreciated that the particular threshold $t_{qMax}$ for how long the prioritized queue may continue to hold prioritized requests is a configurable parameter. For some embodiments, if the prioritized queue is not empty, the detect mode may be designed such that at least one WPS request must be served every $t_{qMax}$ time interval. It should thus be further appreciated that a particular detect mode may be designed to take the aggressiveness of preemptive schemes into consideration by configuring $t_{qMax}$ to manage the invocation of preemptive actions. Moreover, $t_{qMax}$ may be strategically configured by service providers to control the frequency of terminating a lower priority call in session. For instance, a larger value of $t_{qMax}$ may lead to a lower frequency of active mode invocations, whereas a smaller $t_{qMax}$ may ensure shorter call setup delays for higher priority calls.

In practice, if a call request is sitting in a queue longer than a certain pre-defined time, an automatic re-try can be invoked by the local call management entity or the call request will be deleted from the request queue. The latter, in most cases, forces a re-try initiated by the end caller. In either case, the end user experience is negatively impacted. However, if the disclosed detect mode is used, the call setup time for high priority callers can be bounded by $t_{qMax}$, and the end user initiated re-dial can also be eliminated so long as the network is "properly" engineered (i.e., designs in which the high priority traffic forecast is a much smaller portion of the total forecasted traffic). For WPS, due to its critical nature, the number of authorized users is usually strictly limited.

Figure 6:
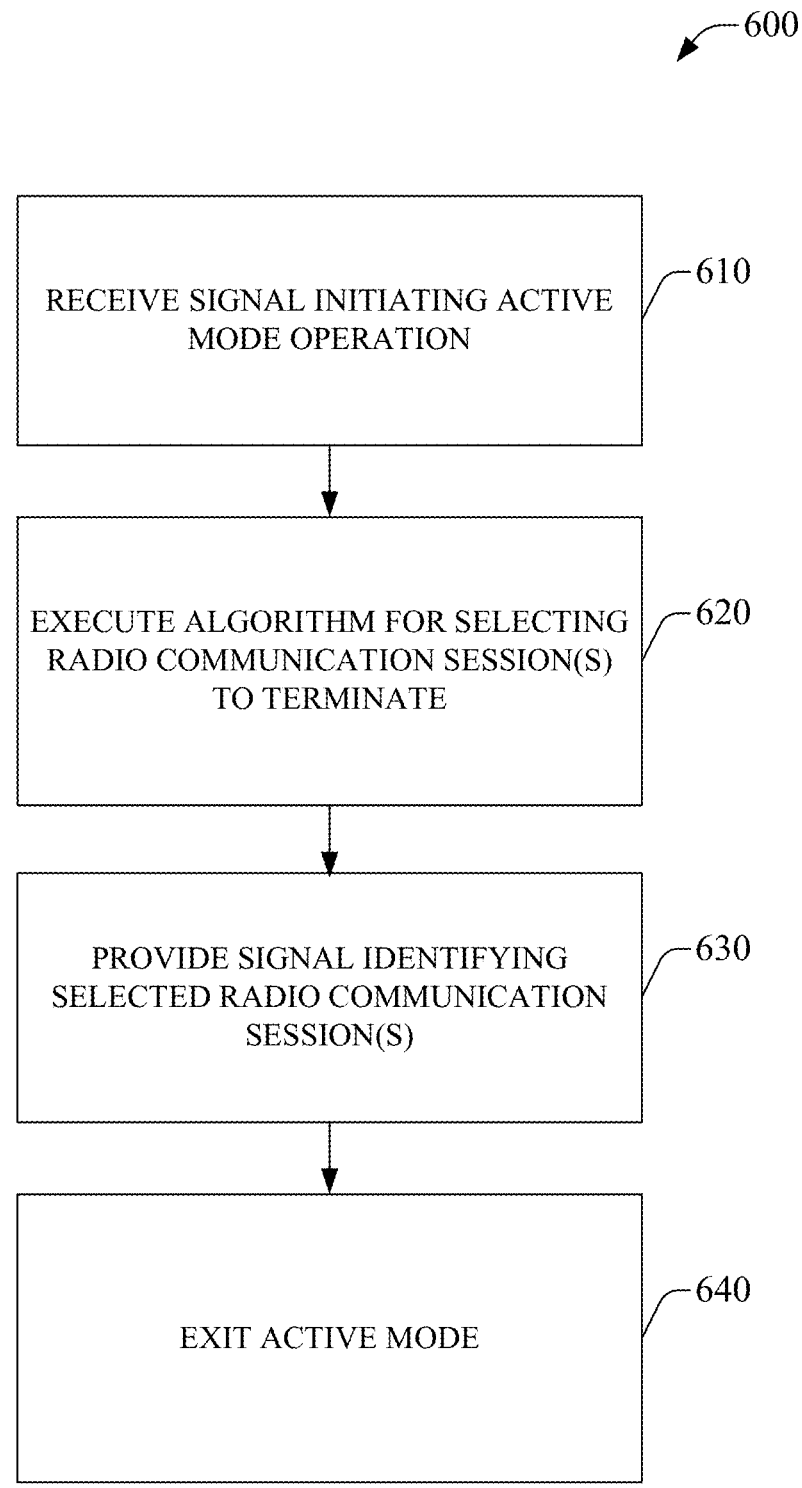
FIG. 6 illustrates a flowchart of an exemplary method for allocating radio resources to accommodate prioritized radio communications in accordance with an aspect of the subject specification.

Referring next to FIG. 6, a flowchart of an exemplary method for allocating radio resources to accommodate prioritized radio communications during active mode operation is provided. As illustrated, process 600 begins at step 610 where a signal is received indicating that the active mode may be initiated. Here, it is thus assumed that a signal, generated during detect mode operation, has been received indicating that all necessary conditions for involuntarily terminating a radio communication in session have been met.

Next, at step 620, process 600 continues with the execution of an algorithm for selecting the particular radio communication(s) to terminate. Here, it should be appreciated that either a single communication or multiple communications can be selected. Although selecting single communications at a time may be less intrusive, such a scheme might be inefficient during particularly extreme circumstances, wherein the queue depth of prioritized calls might be extraordinarily deep. Conversely, although selecting multiple communications might be more efficient, such a scheme might be more intrusive.

It should be further appreciated that the actual selection of radio communications to terminate at step 620 may be performed in various ways. For instance, communication sessions may be selected according to their respective hold times and/or priority level. Furthermore, communication sessions may be evaluated "individually" according to whether individual sessions meet a criteria independent of the other candidate sessions (e.g., selecting the first call determined to be "low" priority), and/or sessions may be evaluated "collectively" according to whether individual sessions meet a criteria relative to other candidate sessions (e.g., evaluating all "low" priority calls and selecting the call with the longest hold time).

Once the session(s) to terminate has/have been selected, process 600 continues to step 630 where a signal identifying the selected session(s) is generated. Here, it should be appreciated that such signal may then be utilized within a particular radio resource control device and/or transmitted to an external system component. And finally, at step 640, process 600 concludes with the active mode being exited, which may be desirable since the involuntary termination of in-session calls should generally be limited. In an embodiment, process 600 may simply return to a detect mode.

Figure 7:
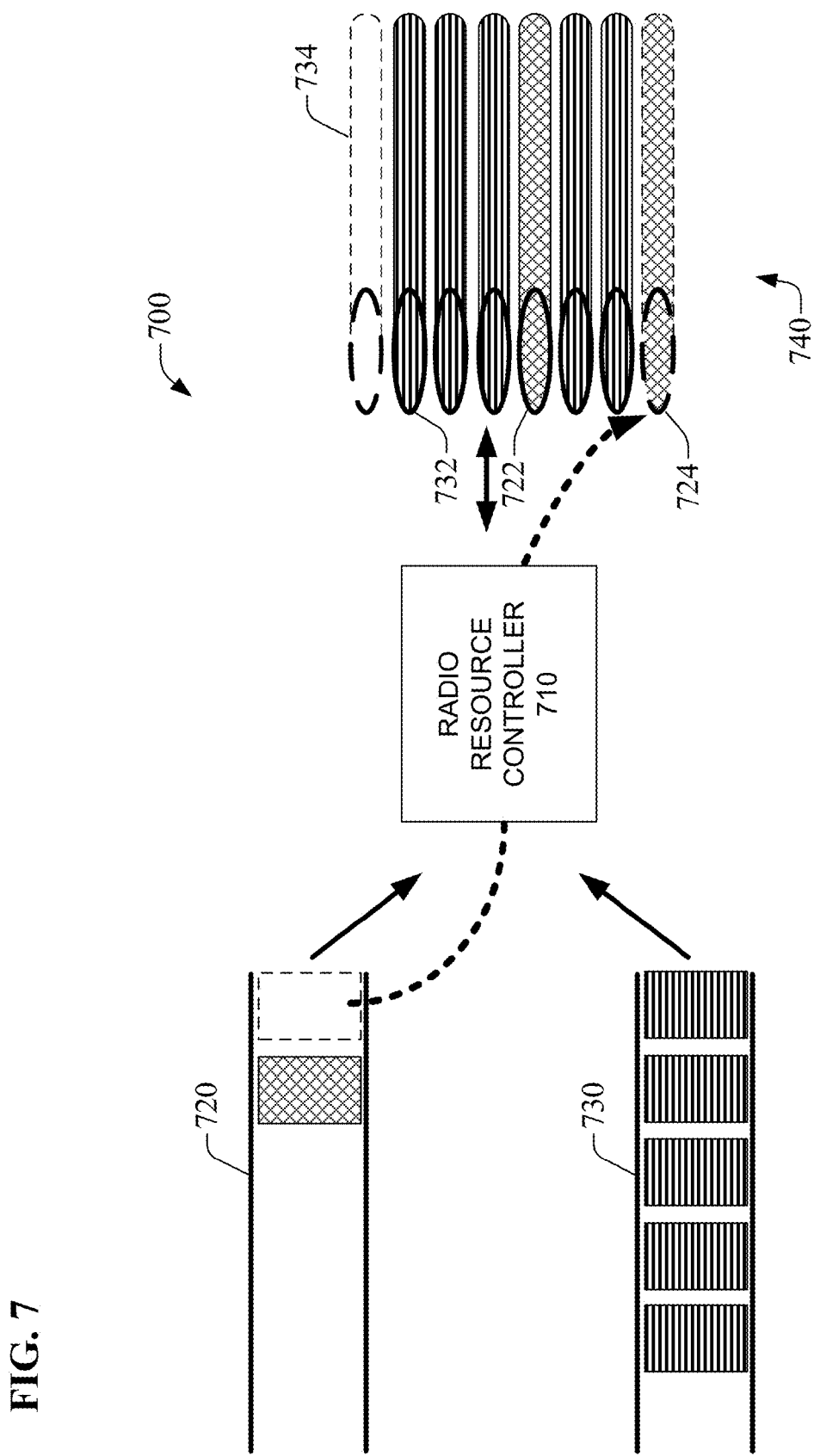
FIG. 7 is a schematic diagram illustrating an exemplary operation of a radio resource controller in active mode in accordance with an aspect of the subject specification.

Referring next to FIG. 7, a schematic diagram illustrating an exemplary operation of a radio resource controller in active mode in accordance with an aspect of the subject specification is provided. For this particular illustration, it may be assumed that the detect mode operation illustrated in FIG. 4 has detected conditions indicated that an active mode should be initiated. Moreover, as illustrated, system 700 again includes a radio resource controller 710, a high-priority queue 720, and a low-priority queue 730. System 700 also includes radio channels 740 which are comprised of in-session high priority calls 722 and in-session low priority calls 732.

However, because radio resource controller 710 is operating in active mode, a particular in-session call 734 is terminated. Here, the active mode may have been activated because each of the seven radio channels 440 in FIG. 4 were being used (i.e., the "radio resource availability" threshold may have been met). For this particular example, terminated in-session call 734 corresponds to a previously identified in-session low priority call 432 in FIG. 4. Accordingly, if it is assumed that only seven radio channels 740 are available, the involuntary termination of in-session call 734 opened a radio channel for the previously queued priority call 724 to use, as shown.

Figure 8:
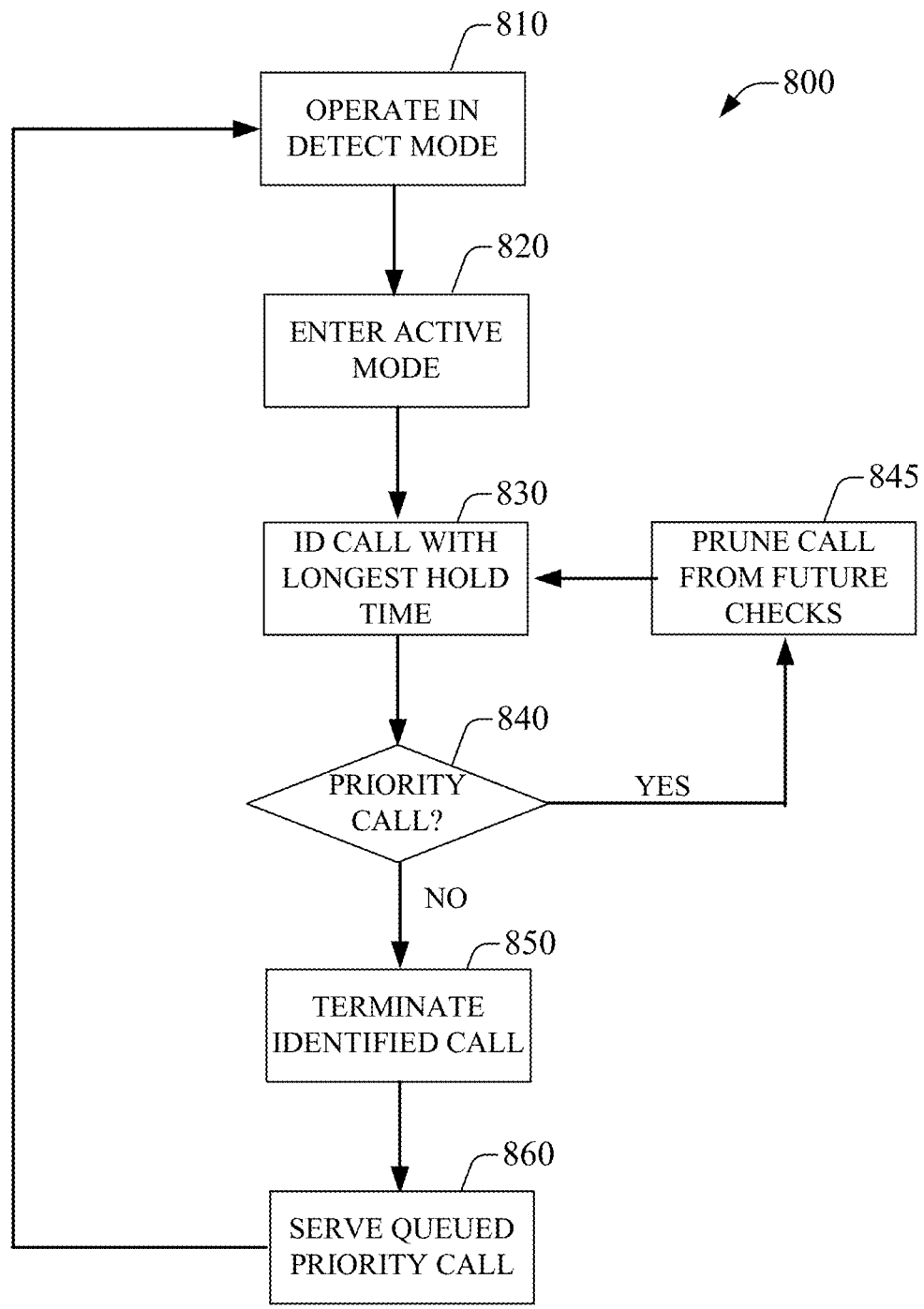
FIG. 8 illustrates an exemplary flowchart of a particular method for operating a radio resource controller in active mode in accordance with an aspect of the subject specification.

Referring next to FIG. 8, an exemplary flowchart of a particular method for operating a radio resource controller in active mode in accordance with an aspect of the subject specification is provided. As illustrated, process 800 begins at step 810 where the radio resource controller is assumed to initially operate in detect mode. Once the necessary conditions have been met, process 800 proceeds to step 820 where the radio resource controller begins to operate in active mode.

For this particular example, selecting which calls to terminate is based on a combination of session length (i.e., the hold time of a particular call) and priority type (e.g., WPS or non-WPS). As such, process 800 continues to step 830 where the radio resource controller evaluates all the "candidate" calls and identifies the call with the longest hold time. Here, it should be noted that tracking the call holding time for a call in session is trivial where the call arrival time is obtainable. Given common billing practice, the call arrival times may be included as part of call CDR records provided by many service providers. Accordingly, a particular embodiment may be configured such that the radio resource controller can access a local CDR maintained in a base station control (BSC) system for all calls served by the BSC system.

At step 840, process 800 continues with a determination of whether the call identified as having the longest hold time is a WPS call. If the identified call is indeed a WPS call, the call is pruned from future checks at step 845 and process 800 loops back to step 830 where the call with the "next" longest call time is identified. If, however, step 840 determines that an identified call is not a WPS call, process 800 proceeds to step 850.

At step 850, the identified non-WPS call with the longest hold time is then terminated. Once this call is terminated, the first queued WPS call is served at step 860. Process 800 then concludes with the radio resource controller ceasing to operate in active mode and returning to operate in detect mode at step 810.

In practice, it should be noted that the particular conditions for involuntarily terminating a call via the radio resource controller's active mode may be configured so that this only occurs during extreme circumstances. In an exemplary embodiment, the active mode might be initiated only if the following two conditions have been met: (1) Radio resources have been 100% utilized for a sustained period of time; (2) WPS call requests have been sitting in the WPS queue for more than $t_{qMax}$. Those two criteria will likely only be met under extreme conditions. As a result, such design would provide preferential QoS treatment for WPS users under extreme conditions where invasive measures can be applied.

Figure 9:
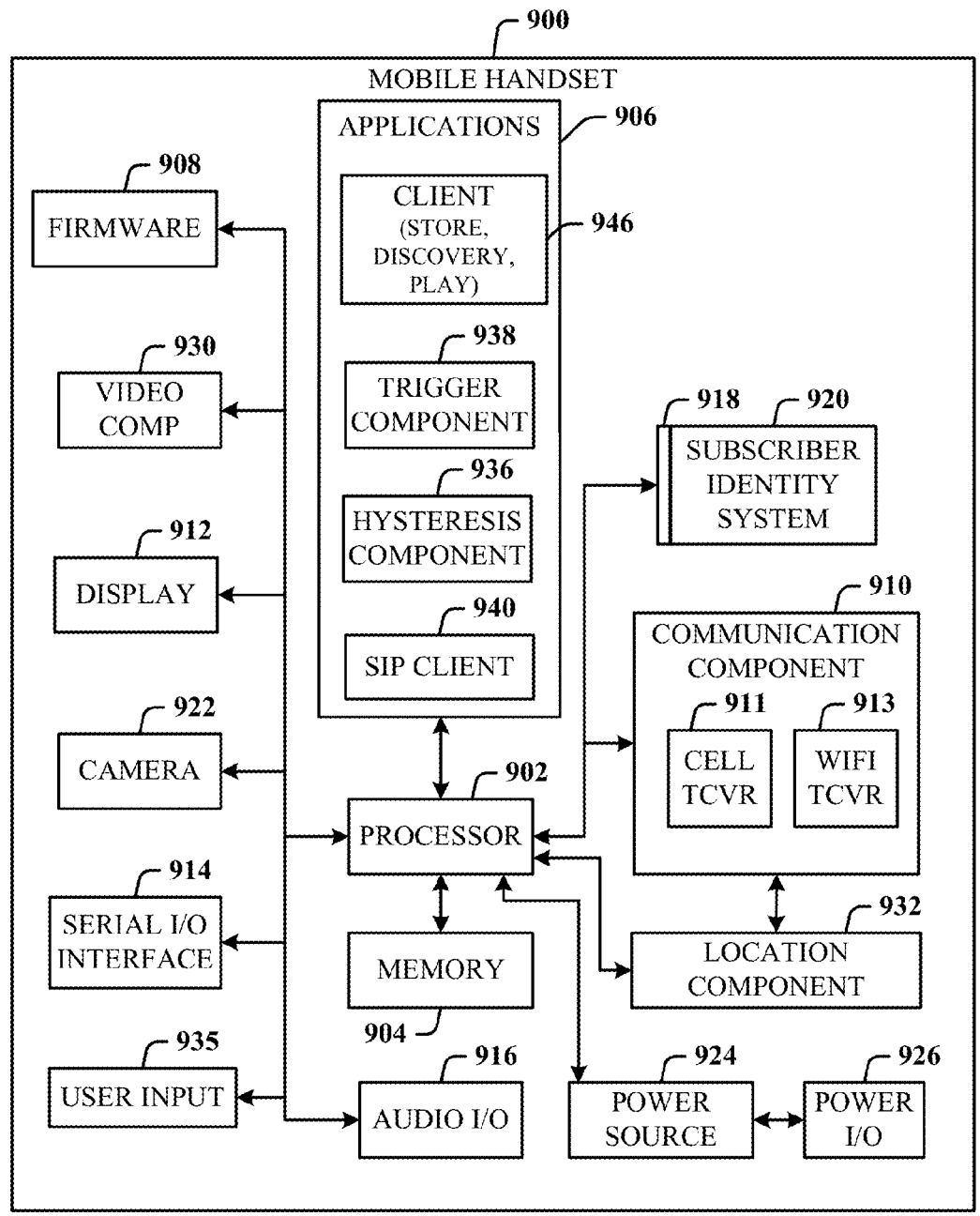
FIG. 9 illustrates an example of a device, a mobile handset that, that can process radio communications in accordance with the embodiments disclosed herein.

FIG. 9 illustrates a schematic block diagram of an exemplary device 900 capable of employing the subject system in accordance with some embodiments of the disclosed subject matter, wherein the exemplary device is a mobile handset 900. In order to provide additional context for various aspects thereof, FIG. 9 and the following discussion are intended to provide a brief, general description of a suitable environment 900 in which the various aspects can be implemented. While the description includes a general context of computer-executable instructions, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the disclosed methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer-readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, . . . ). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and an unlicensed transceiver 913 (e.g., WiFi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. The display 912 can also accommodate the presentation of multimedia content (e.g., music metadata, messages, wallpaper, graphics, . . . ). A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software thereinto.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. A location tracking component 932 facilitates geographically locating the handset 900. As described hereinabove, this can occur when the user initiates the feedback signal automatically or manually. A user input component 934 facilitates the user initiating the quality feedback signal. The input component can include such conventional input device technologies such as a keypad, keyboard, mouse, stylus pen, and touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the WiFi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., WiFi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
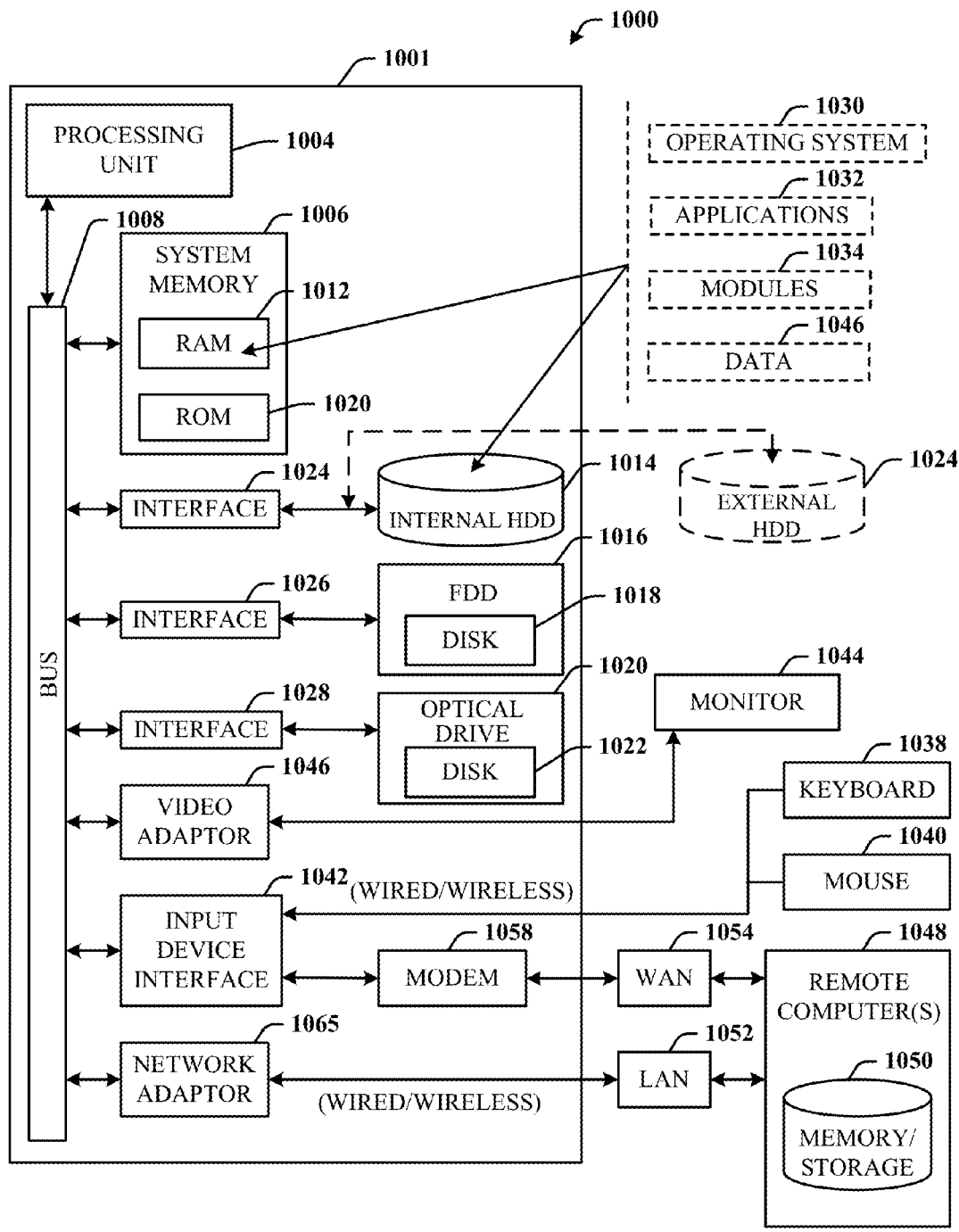
FIG. 10 illustrates a block diagram of a computer operable to execute the disclosed preemptive based radio access control system.

Referring now to FIG. 10, there is illustrated a block diagram of a computer operable to provide networking and communication capabilities between a wired or wireless communication network and a server and/or communication device. In order to provide additional context for various aspects thereof, FIG. 10 and the following discussion are intended to provide a brief, general description of a suitable computing environment 1000 in which the various aspects of the disclosed subject matter can be implemented. While the description above is in the general context of computer-executable instructions that can run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the disclosed subject matter.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the disclosed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 2394 serial port, a game port, a USB port, an IR interface, etc.

A monitor 1044 or other type of display device is also connected to the system bus 1008 through an interface, such as a video adapter 1046. In addition to the monitor 1044, a computer typically includes other peripheral output devices (not shown), such as speakers, printers, etc.

The computer 1002 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the claimed subject matter. It is, of course, not possible to describe every conceivable combination of components or methods for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   determining a queue parameter associated with a queue comprising a request for a prioritized communication session and relating to a condition for initiation of an active mode to initiate a termination of a communication session to facilitate service of the request for the prioritized communication session in the queue based on a frequency of active mode initiations to terminate communication sessions, wherein the initiation of the active mode facilitates determining which of the communication sessions to terminate; and
   determining whether to terminate the communication session to facilitate the service of the request for the prioritized communication session in the queue based on an availability of a radio resource for servicing the request for the prioritized communication session and based on whether the queue parameter associated with the queue satisfies the condition.

2. The system of claim 1, wherein the operations further comprise:
   controlling the frequency of the active mode initiations to terminate the communication sessions based on a defined criterion relating to an amount of time delay associated with setting up prioritized communication sessions.

3. The system of claim 2, wherein the operations further comprise:
   determining a defined threshold length of time that the prioritized communication session is able to be held in the queue based on the defined criterion; and
   setting the defined threshold length of time in response to determining the defined threshold length of time.

4. The system of claim 1, wherein the operations further comprise:
   logging the frequency of the active mode initiations to terminate the communication sessions; and
   determining whether to modify the queue parameter relating to the condition based on the frequency of the active mode initiations to terminate the communication sessions.

5. The system of claim 1, wherein the operations further comprise:
   adjusting a first threshold relating to the availability of the radio resource as a function of a second threshold relating to a length of time that the prioritized communication session is able to be held in the queue.

6. The system of claim 1, wherein the determining the queue parameter further comprises determining the queue parameter associated with the queue based on a characteristic of the queue, wherein the characteristic relates to a length of time that a request for the prioritized communication session has been in the queue, and wherein the operations further comprise:
   determining whether the queue parameter satisfies the condition.

7. The system of claim 6, wherein the operations further comprise:
   determining the length of time that the request for the prioritized communication session has been in the queue; and
   determining whether the length of time that the request for the prioritized communication session has been in the queue exceeds a defined threshold length of time the prioritized communication session is able to be held in the queue to facilitate the determining of whether the queue parameter satisfies the condition.

8. The system of claim 1, wherein the operations further comprise:
   determining which communication session of the communication sessions is to be terminated, based on a defined termination criterion, in response to determining that the request for the prioritized communication session in the queue is to be serviced; and
   determining the communication session is to be terminated based on a result of the determining of which communication session to be terminated.

9. The system of claim 8, wherein the operations further comprise:
   evaluating respective lengths of time of communication of low priority communication sessions of the communication sessions, wherein the communication session is determined to be a low priority communication session, and wherein the low priority communication sessions have respective priority levels that are lower than a priority level of the prioritized communication session; and
   determining the communication session has a longest length of time of communication relative to other respective lengths of time of communication of other low priority communication sessions of the communication sessions,
   wherein the determining the communication session is to be terminated further comprises determining the communication session is to be terminated based on the defined termination criterion indicating the communication session is to be terminated based on the communication session having been determined to have the longest length of time of communication.

10. The system of claim 1, wherein the operations further comprise:
to facilitate the determining of whether to terminate the communication session,
monitoring the queue parameter to facilitate determining whether the queue parameter associated with the queue satisfies the condition;
determining whether the queue parameter satisfies the condition based on the monitoring; and
determining the availability of the radio resource for servicing the request for the prioritized communication session.

11. A method, comprising:
adjusting, by a system comprising a processor, a queue parameter associated with a queue comprising a request for a prioritized communication of traffic and relating to a condition for invoking an active mode to terminate a communication session to facilitate servicing the request for the prioritized communication of traffic in the queue as a function of a frequency of active mode invocations to terminate communication sessions, wherein the invoking of the active mode facilitates determining which of the communication sessions to terminate; and
determining, by the system, whether to terminate the communication session to facilitate the servicing of the request for the prioritized communication of traffic in the queue as a function of an availability of a communication resource for servicing the request for the prioritized communication of traffic and as a function of whether the queue parameter associated with the queue satisfies the condition.

12. The method of claim 11, further comprising:
controlling, by the system, the frequency of the active mode invocations to terminate the communication sessions based on a defined criterion relating to an amount of time delay associated with setting up prioritized communications of traffic.

13. The method of claim 12, further comprising:
determining, by the system, a defined threshold length of time that the prioritized communication of traffic is able to be held in the queue based on the amount of time delay; and
configuring, by the system, the defined threshold length of time based on a result of the determining the defined threshold length of time.

14. The method of claim 11, further comprising:
determining, by the system, a length of time that the request for the prioritized communication of traffic has been in the queue; and
determining, by the system, whether the length of time that the request for the prioritized communication of traffic has been in the queue exceeds a defined threshold length of time that the prioritized communication of traffic is able to be held in the queue to facilitate the determining of whether to terminate the communication session.

15. The method of claim 11, further comprising:
determining, by the system, which communication session of the communication sessions is to be terminated, based on a defined termination factor, in response to determining that the request for the prioritized communication of traffic in the queue is to be serviced;
determining, by the system, the communication session is to be terminated based on a result of the determining of which communication session is to be terminated; and
initiating, by the system, termination of the communication session in response to the determining the communication session is to be terminated.

16. The method of claim 15, further comprising:
in response to the termination of the communication session, facilitating, by the system, establishing a prioritized communication session in connection with the prioritized communication of traffic.

17. The method of claim 15, further comprising:
evaluating, by the system, information relating to the communication session to facilitate the determining of whether to terminate the communication session.

18. The method of claim 11, further comprising:
determining, by the system, a length of session time that the communication session has remained in session; and
determining, by the system, a priority level associated with the communication session, wherein the determining whether to terminate the communication session further comprises determining whether to terminate the communication session based on the length of the session time that the communication session has remained in session and the priority level associated with the communication session.

19. A non-transitory machine-readable storage medium, comprising executable instructions that, when executed by a processor, facilitate performance of operations, comprising:
determining a queue value associated with a queue comprising a request for a prioritized communication of traffic and relating to a condition for initiating an active mode to terminate a communication session to facilitate service of the request for the prioritized communication of traffic in the queue as a function of a frequency of active mode initiations to terminate communication sessions, wherein the initiating of the active mode facilitates determining which of the communication sessions to terminate; and
determining whether to terminate the communication session to facilitate the service of the request for the prioritized communication of traffic in the queue based on a radio resource availability to service the request for the prioritized communication of traffic and based on whether the queue value associated with the queue satisfies the condition.

20. The non-transitory machine-readable storage medium of claim 19, wherein the operations further comprise:
determining the radio resource availability to service the request for the prioritized communication of traffic;
determining whether the queue value satisfies the condition;
determining the communication session is to be terminated based on a first result of the determining the radio resource availability and a second result of the determining whether the queue value satisfies the condition; and
initiating termination of the communication session in response to the determining the communication session is to be terminated.

* * * * *